(12) United States Patent
Hunter

(10) Patent No.: US 10,766,637 B2
(45) Date of Patent: Sep. 8, 2020

(54) AIRFIELD LIGHT

(71) Applicant: Eaton Intelligent Power Limited, Dublin (IE)

(72) Inventor: Vivian L. Hunter, Simsbury, CT (US)

(73) Assignee: Eaton Intelligent Power Limited, Dublin (IE)

( * ) Notice: Subject to any disclaimer, the term of this patent is extended or adjusted under 35 U.S.C. 154(b) by 57 days.

(21) Appl. No.: 15/975,312

(22) Filed: May 9, 2018

(65) Prior Publication Data
US 2018/0328571 A1 Nov. 15, 2018

Related U.S. Application Data

(60) Provisional application No. 62/503,717, filed on May 9, 2017.

(51) Int. Cl.
*B64F 1/20* (2006.01)
*F21V 11/16* (2006.01)
(Continued)

(52) U.S. Cl.
CPC ............... *B64F 1/20* (2013.01); *B64F 1/36* (2013.01); *F21S 8/032* (2013.01); *F21V 3/02* (2013.01);
(Continued)

(58) Field of Classification Search
CPC ....... B64F 1/20; F21W 2111/06; F21V 11/18; F21V 15/015; F21V 15/06; F21V 7/18;
(Continued)

(56) References Cited

U.S. PATENT DOCUMENTS 5,806,965 A 9/1998 Deese
7,507,006 B2 * 3/2009 Kao ................... G03B 21/2086
353/20

(Continued)

FOREIGN PATENT DOCUMENTS

| DE | 19743826 A1 | 4/1999 |
| FR | 2797940 A1 | 3/2001 |
| WO | 2015002928 A1 | 1/2015 |

OTHER PUBLICATIONS

European Search Report, Application No. 18171665.5, dated Sep. 12, 2018, pp. 10.

*Primary Examiner* — Evan P Dzierzynski
*Assistant Examiner* — Keith G. Delahoussaye
(74) *Attorney, Agent, or Firm* — Stinson LLP

(57) ABSTRACT

An airfield light, components thereof, and associated methods. The airfield light can include a baffle including a baffle body and one or more baffle members secured to the baffle body. The baffle members are configured to cover portions of a baffle window. At least one light source is mounted in association with the baffle and emits light out of the baffle window. The baffle members cover portions of the baffle window for blocking light transmission therethrough. A method of assembling an airfield light includes arranging a baffle to shroud a light assembly and removing a baffle member to permit light from the light assembly to emit through a portion of a baffle window opened by removing the baffle member. A baffle for an airfield light is also disclosed.

18 Claims, 18 Drawing Sheets

(51) Int. Cl.
*B64F 1/36* (2017.01)
*F21V 29/503* (2015.01)
*F21V 29/70* (2015.01)
*F21S 8/00* (2006.01)
*F21V 3/02* (2006.01)
*F21V 15/01* (2006.01)
*F21V 17/16* (2006.01)
*F21V 7/06* (2006.01)
*F21W 111/06* (2006.01)
*F21Y 115/10* (2016.01)
*F21Y 113/13* (2016.01)
*F21V 17/00* (2006.01)
*F21Y 113/00* (2016.01)
*F21V 17/12* (2006.01)
*F21V 19/00* (2006.01)
*F21V 31/00* (2006.01)

(52) U.S. Cl.
CPC .............. *F21V 11/16* (2013.01); *F21V 15/01* (2013.01); *F21V 17/164* (2013.01); *F21V 29/503* (2015.01); *F21V 29/70* (2015.01); *F21V 7/06* (2013.01); *F21V 17/005* (2013.01); *F21V 17/12* (2013.01); *F21V 19/0055* (2013.01); *F21V 31/005* (2013.01); *F21W 2111/06* (2013.01); *F21Y 2113/00* (2013.01); *F21Y 2113/13* (2016.08); *F21Y 2115/10* (2016.08)

(58) Field of Classification Search
CPC ... F21V 14/08; F21V 14/085; B63B 2727/00; B63B 2201/00; F21L 15/04; F21S 41/692
See application file for complete search history.

(56) References Cited

U.S. PATENT DOCUMENTS

| | | | |
|---|---|---|---|
| 7,736,037 B2* | 6/2010 | Losak | G03B 21/28 362/539 |
| 8,564,456 B2 | 10/2013 | Selevan | |
| 8,591,073 B2 | 11/2013 | Peck et al. | |
| 9,206,961 B1 | 12/2015 | Bastiani et al. | |
| 2008/0002410 A1 | 1/2008 | Burton et al. | |
| 2008/0049422 A1 | 2/2008 | Trenchard et al. | |
| 2010/0102730 A1* | 4/2010 | Simon | F21V 23/0464 315/152 |
| 2015/0308628 A1 | 10/2015 | Athalye et al. | |
| 2017/0129393 A1* | 5/2017 | Johnson | B60Q 1/0076 |
| 2017/0208693 A1 | 7/2017 | Van Bommel et al. | |

* cited by examiner

US 10,766,637 B2

AIRFIELD LIGHT

CROSS-REFERENCE TO RELATED APPLICATION

The present application claims the benefit of U.S. Provisional Application No. 62/503,717, filed May 9, 2017, the entirety of which is hereby incorporated by reference.

FIELD OF THE DISCLOSURE

The present disclosure generally relates to lights, and more specifically airfield lights such as lights used along runways or taxiways.

BACKGROUND OF THE DISCLOSURE

Airfield lights are used for various purposes, such as to indicate to airfield personnel and pilot boundaries and/or intended directions of travel along runways and/or taxiways.

SUMMARY OF THE DISCLOSURE

In one aspect, an airfield light includes a heat sink and a first light module secured to the heat sink. A baffle includes a generally opaque baffle body defining a window having a first open portion through which light emitted from the first light modules may pass. A generally opaque baffle member is secured to the baffle body and blocks a closed portion of window to inhibit light emitted from the first light module from passing therethrough. The generally opaque baffle member is removable from the baffle body to create a second open portion of the window.

In another aspect, a method of assembling an airfield light includes mounting first and second light assemblies on a heat sink. The method includes removing at least a first generally opaque baffle member from a baffle body of a baffle. The baffle is arranged to shroud the first and second light assemblies. The first and second light assemblies are configured to emit light through a window defined by the baffle. The second light assembly is configured to emit light through a portion of the window opened by removing the first generally opaque baffle member from the baffle body.

In yet another aspect, a baffle for an airfield light includes a generally opaque shroud defining a window. The baffle includes a first generally opaque baffle member secured to the shroud. The first generally opaque baffle member closes a first portion of the window. The first generally opaque baffle member is removable from the shroud for opening the first portion of the window.

Other objects and features of the present disclosure will be in part apparent and in part pointed out herein.

DETAILED DESCRIPTION

Figure 1:
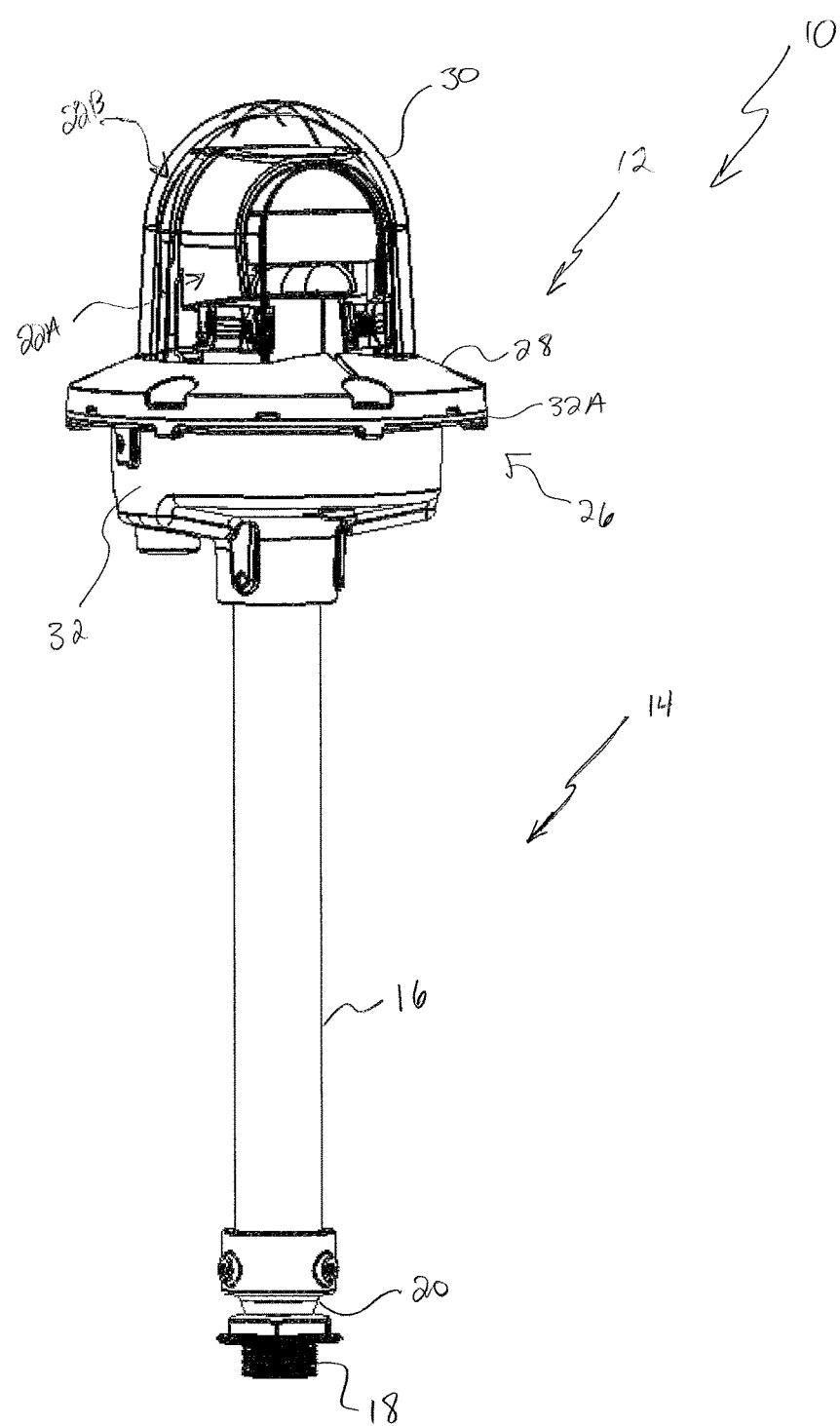
FIG. 1 is a front perspective of a light of an airfield light of the present disclosure.

Referring to FIG. 1, an embodiment of an airfield light is generally indicated at reference number 10. The airfield light can be used for various purposes. For example, several of the airfield lights 10 may be positioned one after another along a runway for indicating boundaries, intended direction of travel, and/or distance to the end of the runway, etc. As will be described in further detail below, the light 10 has a modular design permitting the light to be configured during manufacture to meet a variety of lighting needs.

The illustrated embodiment of the light 10 is an elevated airfield light (e.g., a high intensity runway light) including a head 12 and a stem 14. The stem 14 includes a post 16, such as a pipe, for elevating the head 12. A threaded connector 18 is provided at a lower end of the stem 14 for mounting the light 10 on a suitable base. A frangible coupling 20 connects the post 16 to the connector 18. The head 12 includes first and second (front and rear) light assemblies 22A, 22B, a base 26, a collar 28, and a cover 30 for covering the light assemblies 22A, 22B. As explained in more detail below, the first light assembly 22A is configured to emit light of a selected first color generally in a first direction (e.g., forward), and the second light assembly 22B is configured to emit light of a selected second color in a second direction (e.g., rearward), which may be generally opposite the first direction. The first and second colors may be the same color or may be different colors.

Figure 2:
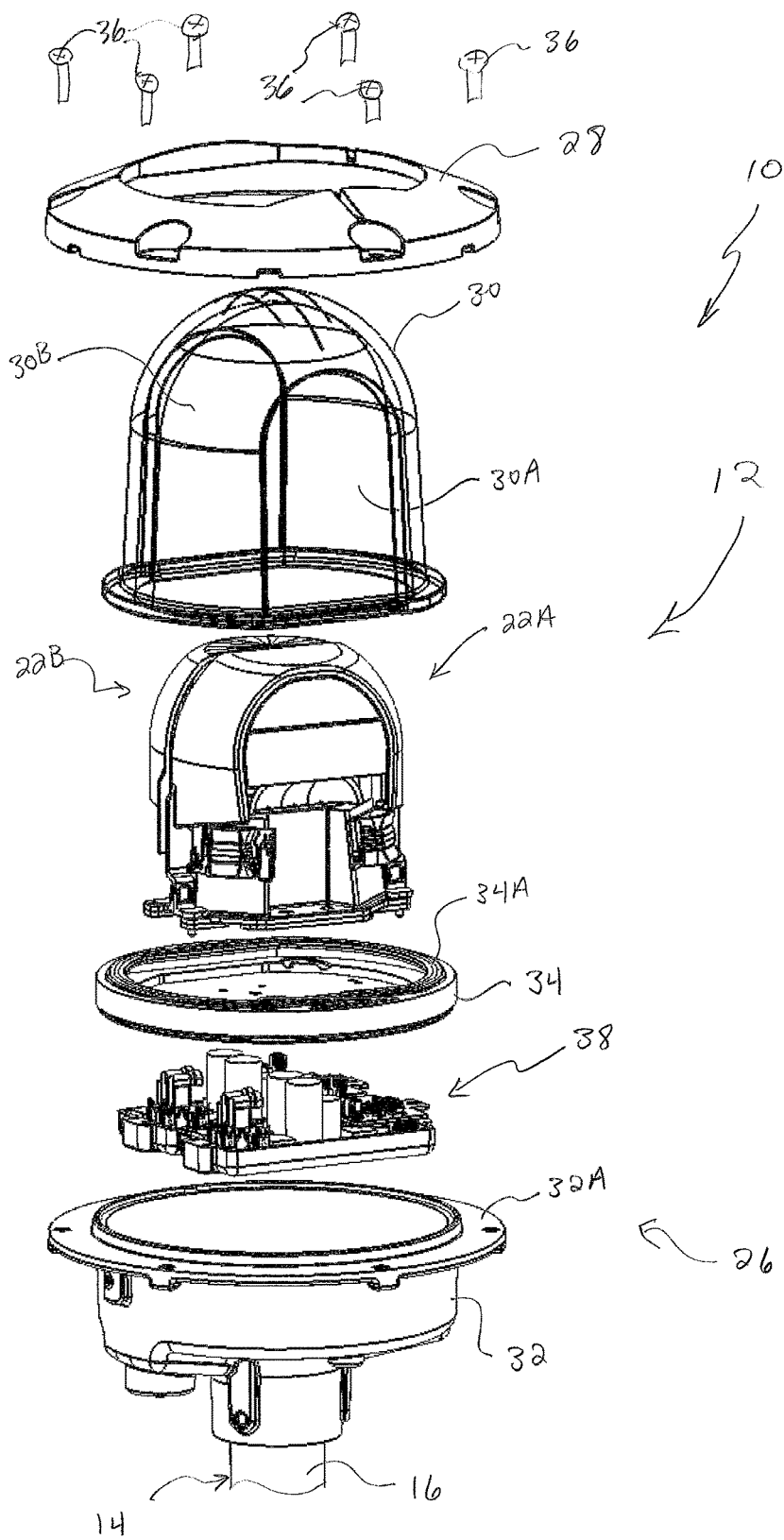
FIG. 2 is an exploded front perspective of an upper portion of the airfield light of FIG. 1.

Referring to FIG. 2, the cover 30 is generally colorless, although it may be colored and/or tinted. The cover 30 has a generally dome shape including a rounded top portion, a first (front) truncated portion 30A (i.e., first planar portion) generally opposing the first light assembly 22A through which light emitted from the first light assembly is transmitted, and a second (rear) truncated portion 30B (i.e., second planar portion) generally opposing the second light assembly 22B through which light emitted from the second light assembly is transmitted. The interior and exterior surfaces of the first and second truncated portions 30A, 30B are generally planar and parallel to each other. The cover 30 partially reflects light emitted from the first and second light assemblies 22A, 22B to create a halo effect, whereby the first light is transmitted through a first (front) half of the cover including a first (front) half of the rounded top portion of the cover, and the second light is transmitted through a second (rear) half of the cover including a second (rear) half of the rounded top portion. In this way, light emitted by the airfield light 10 is visible by pilots flying above the airfield. The cover 30 may comprise plastic, glass or another suitable light-transmissible material.

Referring still to FIG. 2, the base 26 includes a housing 32 defining a cavity, a platform 34 disposed over an open upper end of the housing, and the collar 28 secured (e.g., by fasteners 36) to a flange 32A of the housing 32. Electronics and/or electrical components 38 for operating the light assemblies are positioned in the housing 26 and are electrically connected to the light assemblies 22A, 22B (e.g., by suitable cables or wiring). The light assemblies 22A, 22B are mounted on the platform 34, as explained in more detail below. In FIG. 2, a gasket 34A is shown on an upper end of the platform 34. In assembly, a lower flange 30C of the cover 30 is sandwiched between the platform 34 (below) and the gasket 34A (above). The collar 28 secures the cover 30 to the base 26 by clamping the gasket 34A and flange 30C of the cover between the collar and the platform 34. The gasket 34A inhibits ingress of liquid and debris into the light 10 to protect the light assemblies 22A, 22B, electronics and/or electrical components 38. A lower end of the housing 26 is mounted on an upper end of the stem 14. Cables or wiring from the electronics and/or electrical components 38 in the housing 26 are fed through the stem 14 and out a lower end of the stem. The base 26 and stem 14 may be formed from metal (e.g., cast aluminum) or other suitable material.

With reference to FIGS. 3-6, the first (front) light assembly 22A will be described in further detail with the understanding that the second (rear) light assembly 22B can be essentially the same as the front light assembly or different, depending on the desired construction of the light 10 and the particular need for front and rear lighting (e.g., intensity of light and/or color of light). In the embodiment shown in FIGS. 1 and 2, the second (rear) light assembly 22B has a slightly different construction, as described in further detail below with reference to FIGS. 16-18, but the two light assemblies 22A, 22B can have the same or similar construction. As will be understood, the front and rear light assemblies 22A, 22B may emit different colors of light, and it may be desirable to prevent light of a first color from the first light assembly from emitting in the second direction (e.g., rearward), and likewise may be desirable to prevent light of a second color different than the first color from the second light assembly from emitting in the first direction (e.g., forward). In one instance, light of a first color indicates (e.g., to an airplane pilot) travel in that direction is permitted, and light of a second different color indicates travel in that direction is not permitted. In other words, the direction of travel is one way, in a direction toward the light of the first color emitted from the first light assemblies 22A. However, other configurations can be used (e.g., the same color can be emitted from the front and rear light assemblies).

Figure 3:
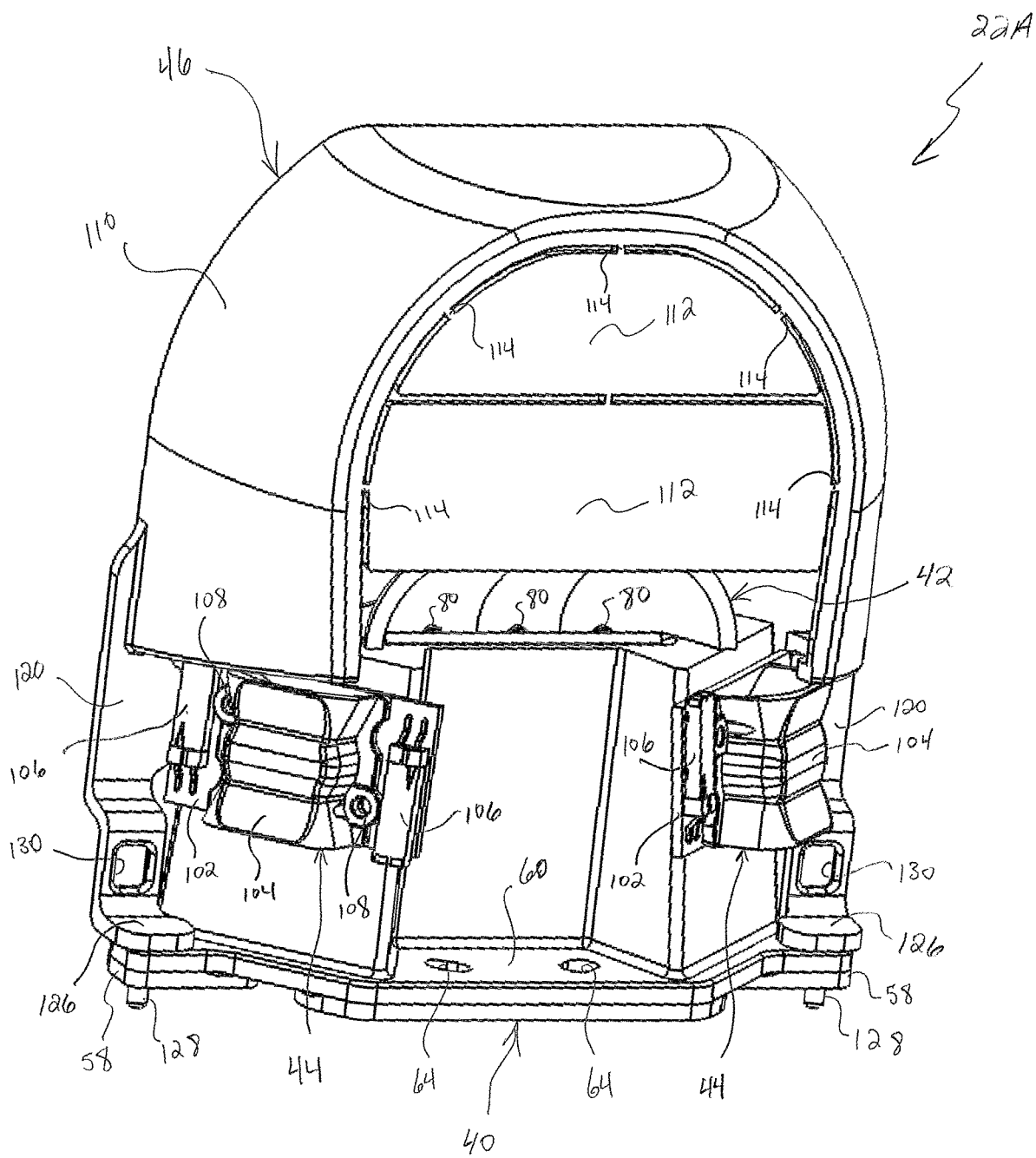
FIG. 3 is a front perspective of a first light assembly of the airfield light of FIG. 1.
Figure 5:
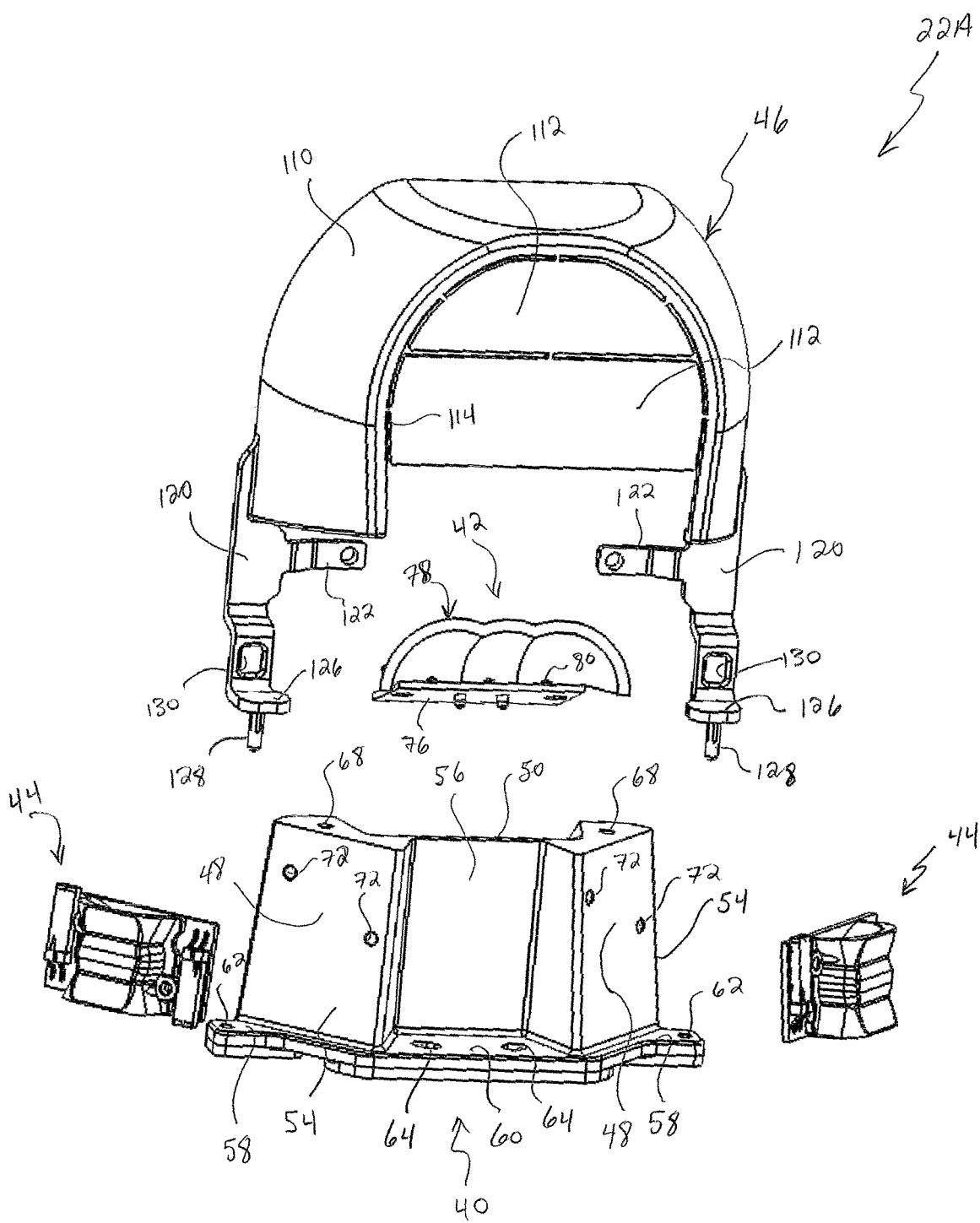
FIG. 5 is an exploded front perspective of the first light assembly.

As shown in FIG. 3, the light assembly 22A generally includes a support 40, at least one illuminator (e.g., a directional LED module 42, and two halo LED modules 44), and a baffle 46. Although three illuminators 42, 44 are shown, other numbers can be used, such as at least one, two, three, four, five, etc. In the illustrated embodiment, the illuminators 42, 44 are LED modules (i.e., LED assemblies or LED illuminators), and the support 40 is a heat sink. The heat sink 40 can be formed of a suitable thermally conductive and heat-dissipating material, such as metal (e.g., cast aluminum). The illustrated heat sink 40 includes two front LED module mounting surfaces 48 (FIG. 5) and an upper LED module mounting surface 50 (FIG. 5). The two halo LED modules 44 are mounted (e.g., by suitable fasteners 52 (FIG. 5)) on the front LED module mounting surfaces 48. The directional LED module 42 (e.g., high intensity LED module) is mounted on the upper LED module mounting surface 50.

Figure 6:
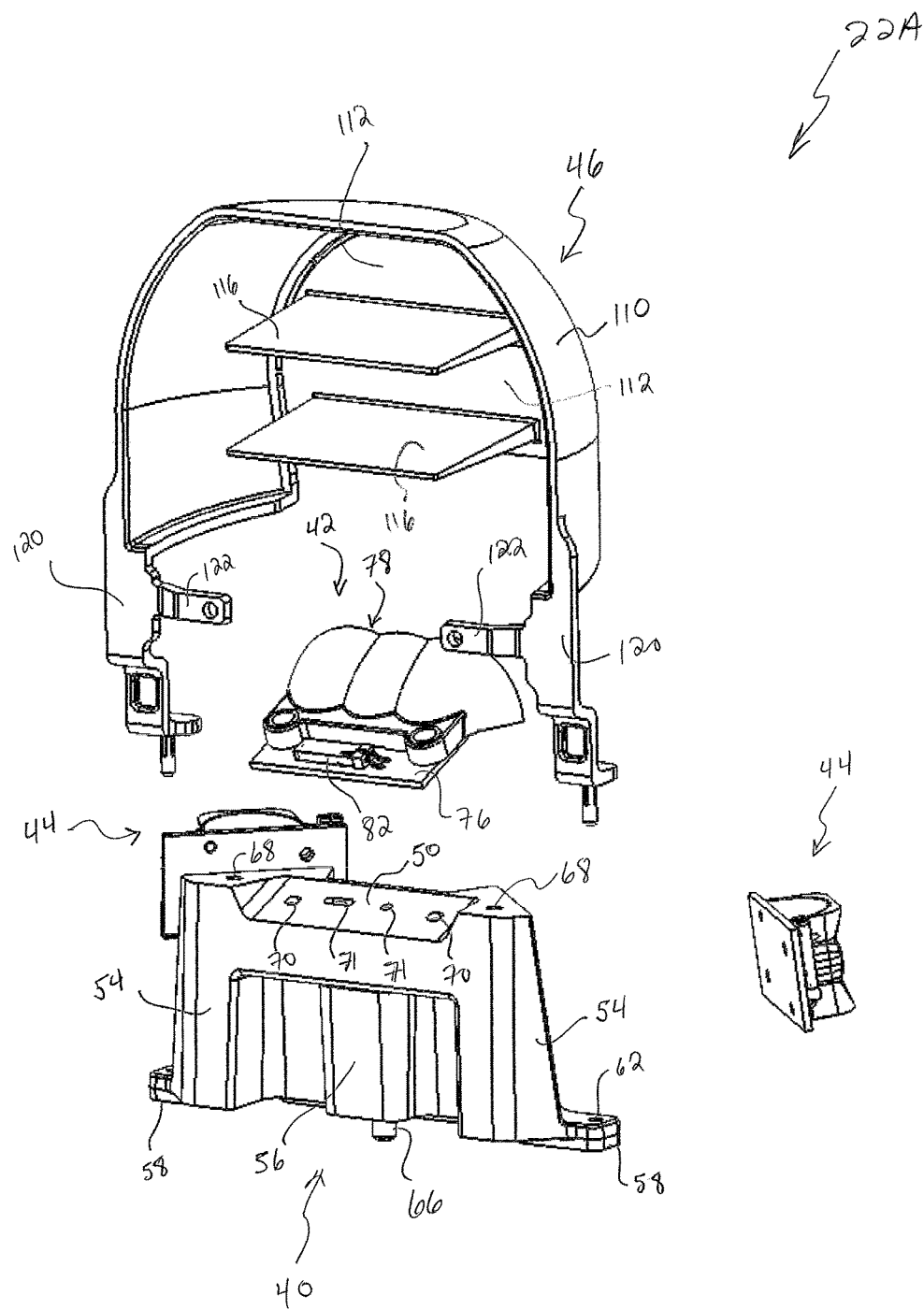
FIG. 6 is an exploded rear perspective of the first light assembly.

As shown in FIG. 5, the heat sink 40 includes first and second opposite columns 54 and a wall 56 extending between the columns. The heat sink 40 includes left and right flanges 58, a front flange 60 having respective openings 62, 64 therein, and a downwardly extending protrusion 66 (FIG. 6) for mounting the heat sink on the platform 34, as described further below. The columns 54 are generally upright, and openings 68 are provided in heads of the columns for receiving fasteners, as described below. The upper LED module mounting surface 50 is provided on the top of the wall 56 and extends between the columns 54. Referring to FIG. 6, the LED module mounting surface 50 has two outer fastener openings 70 and two inner alignment openings 71 for mounting the LED module 42 thereon. The LED module mounting surface 50 is inclined with respect to horizontal. More specifically, the LED module mounting surface 50 is inclined upward from rear to front for mounting the LED module 42 in a desired orientation, described in further detail below. As shown in FIG. 5, the two front LED module mounting surfaces 48 are provided on front surfaces of the columns 54. The left front LED module mounting surface 48 faces forward and to the left, and the right front LED module mounting surface 48 faces forward and to the right. Fastener openings 72 are provided in the front LED module mounting surfaces 48 for mounting the halo LED modules 44 thereon.

As shown in FIGS. 5-8, the directional LED module 42 includes a support or board 76 (e.g., printed circuit board or PCB), a reflector 78, and three LEDs 80 (broadly, "light sources" or "light emitting components"). Desirably, the three LEDs 80 are configured to emit the same color, but different colors could be used. The LED module 42 also includes an electrical connector 82 for providing power and/or control signals to the LED module from the electronics and/or electrical components 38 in the housing 32. The reflector 78, the LEDs 80, and the connector 82 are mounted on the board 76. The board 76 is configured for transmitting the power and/or control signals from the connector 82 to the LEDs 80. In other words, the LEDs 80 are electrically connected to the connector 82 via the board 76.

Figure 7:
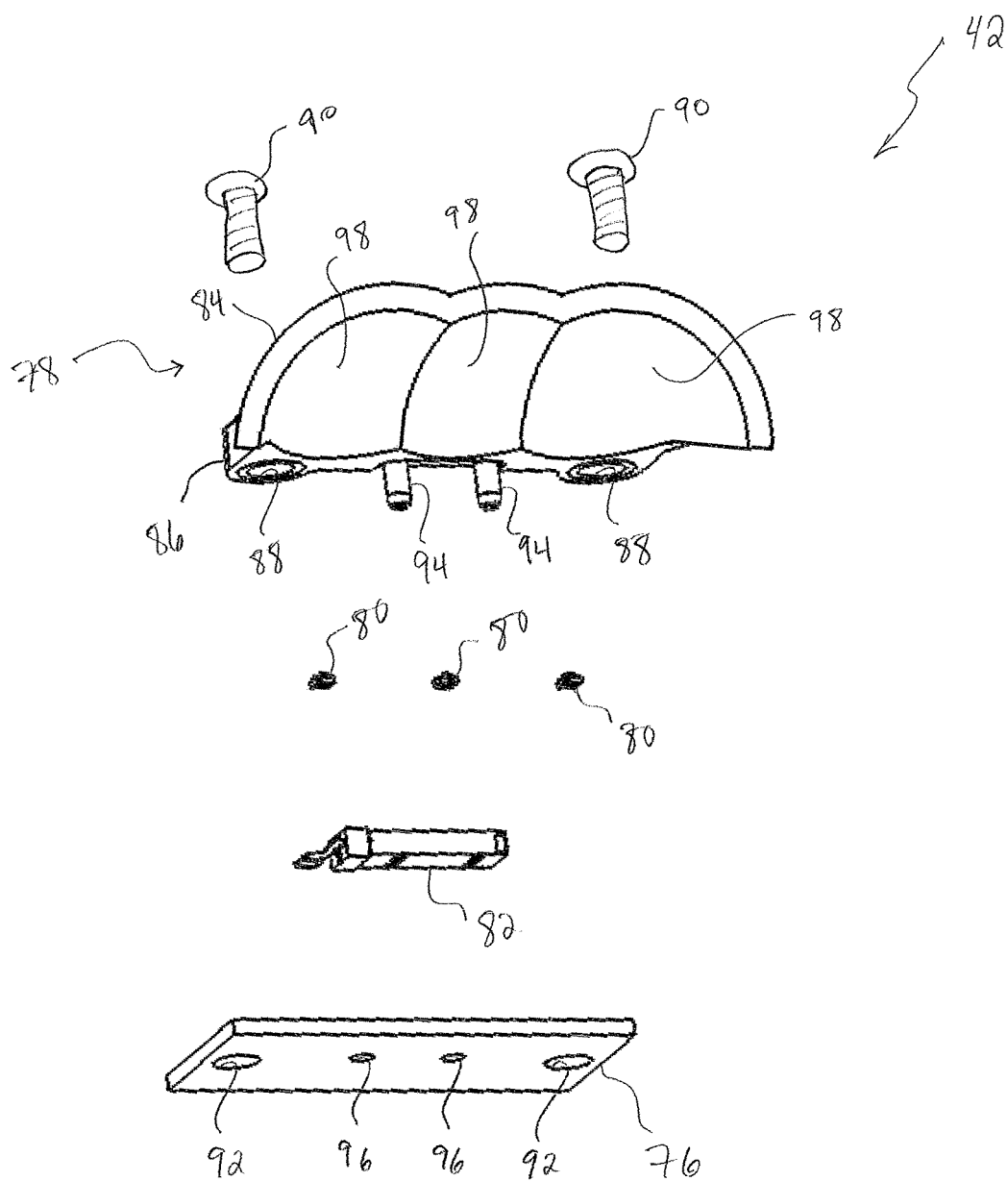
FIG. 7 is an exploded front perspective of a light module of the light assembly.
Figure 8:
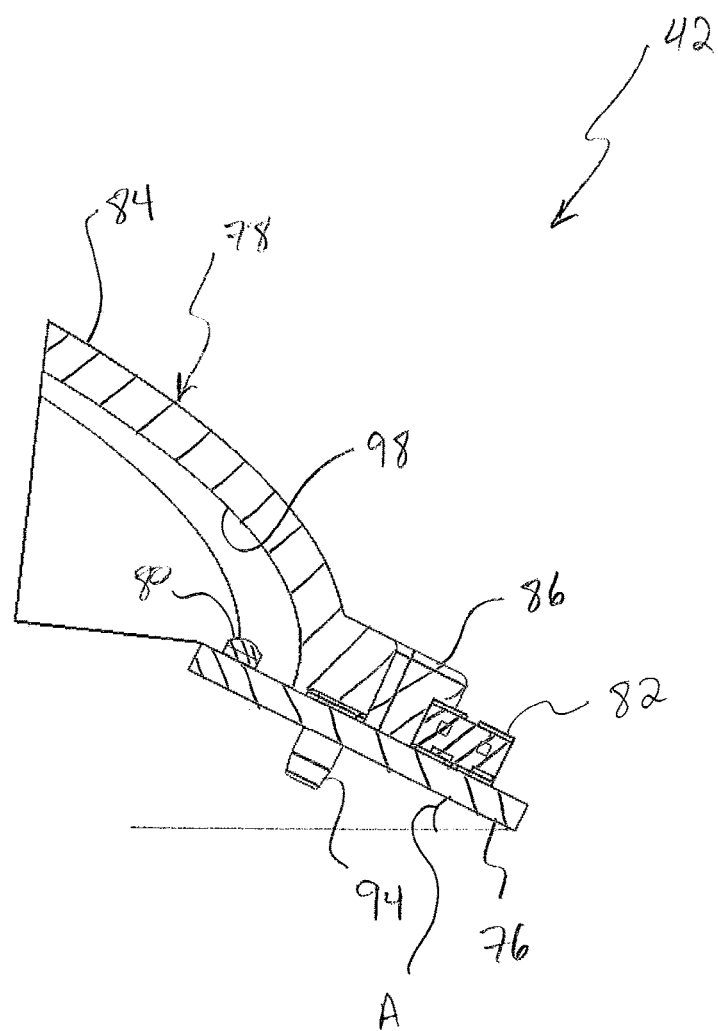
FIG. 8 is a section of the light module taken in the plane including line 8-8 shown in FIG. 6.
Figure 9:
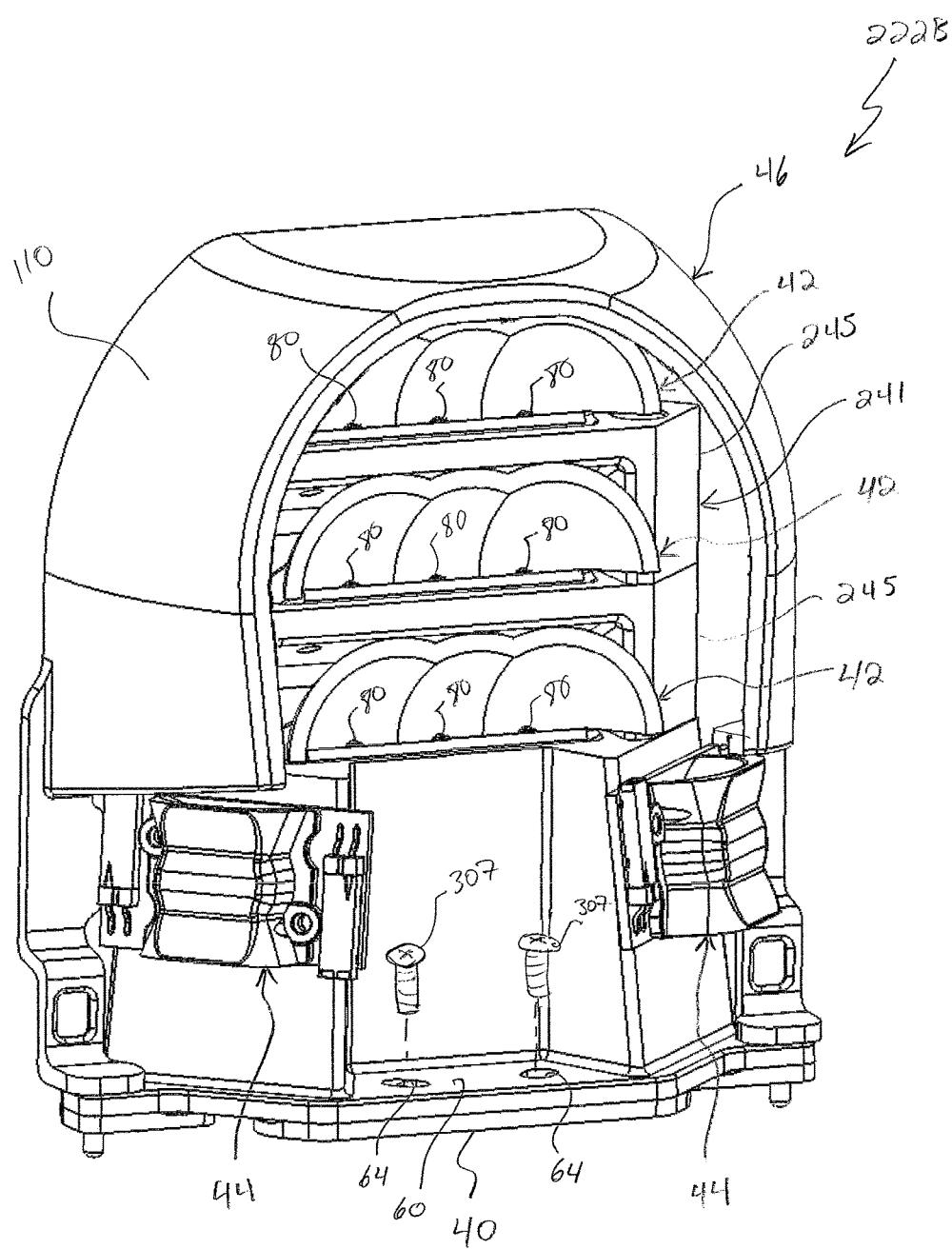
FIG. 9 is a front perspective of a second embodiment of a light assembly of the present disclosure.
Figure 10:
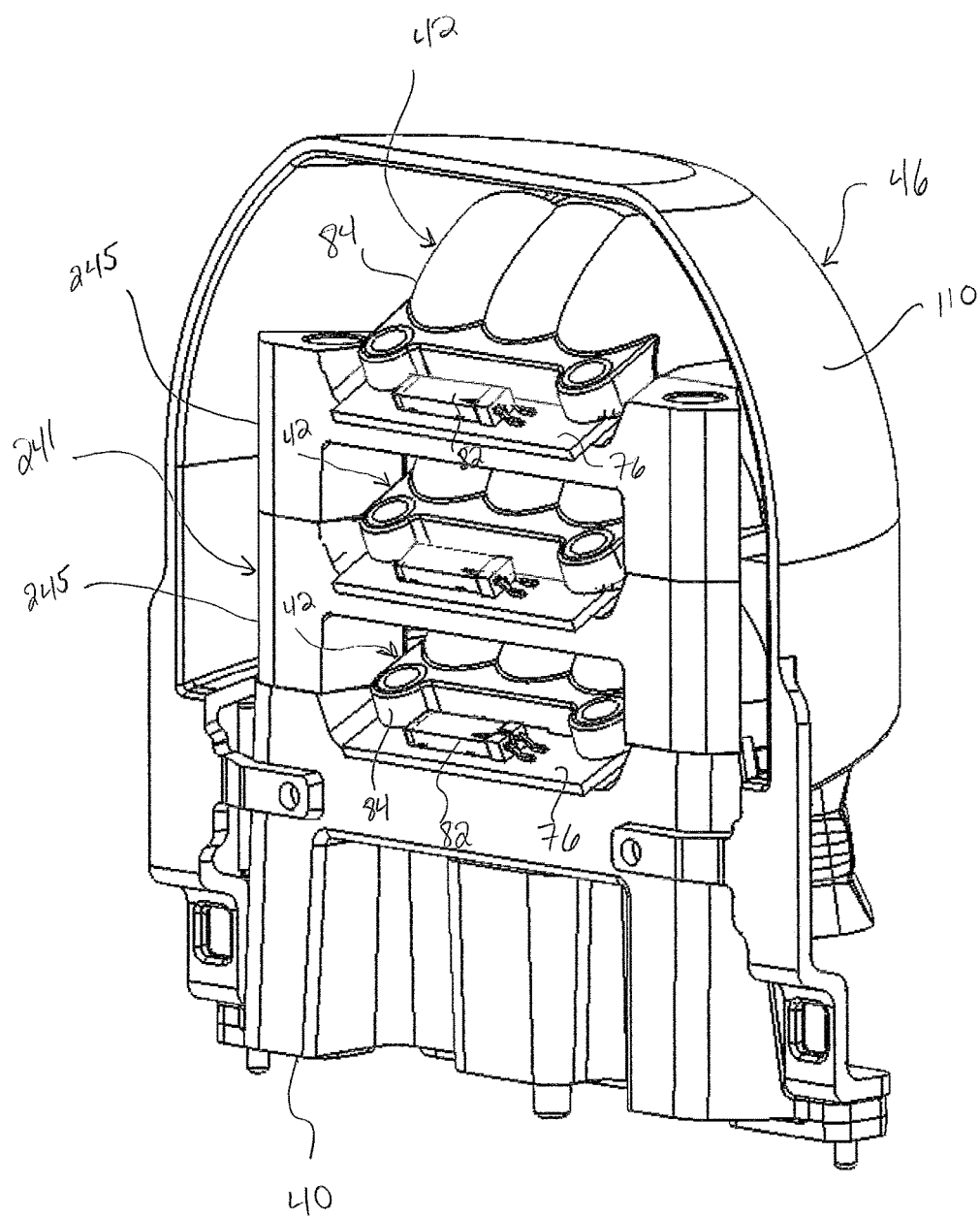
FIG. 10 is a rear perspective of the light assembly of FIG. 9.
Figure 11:
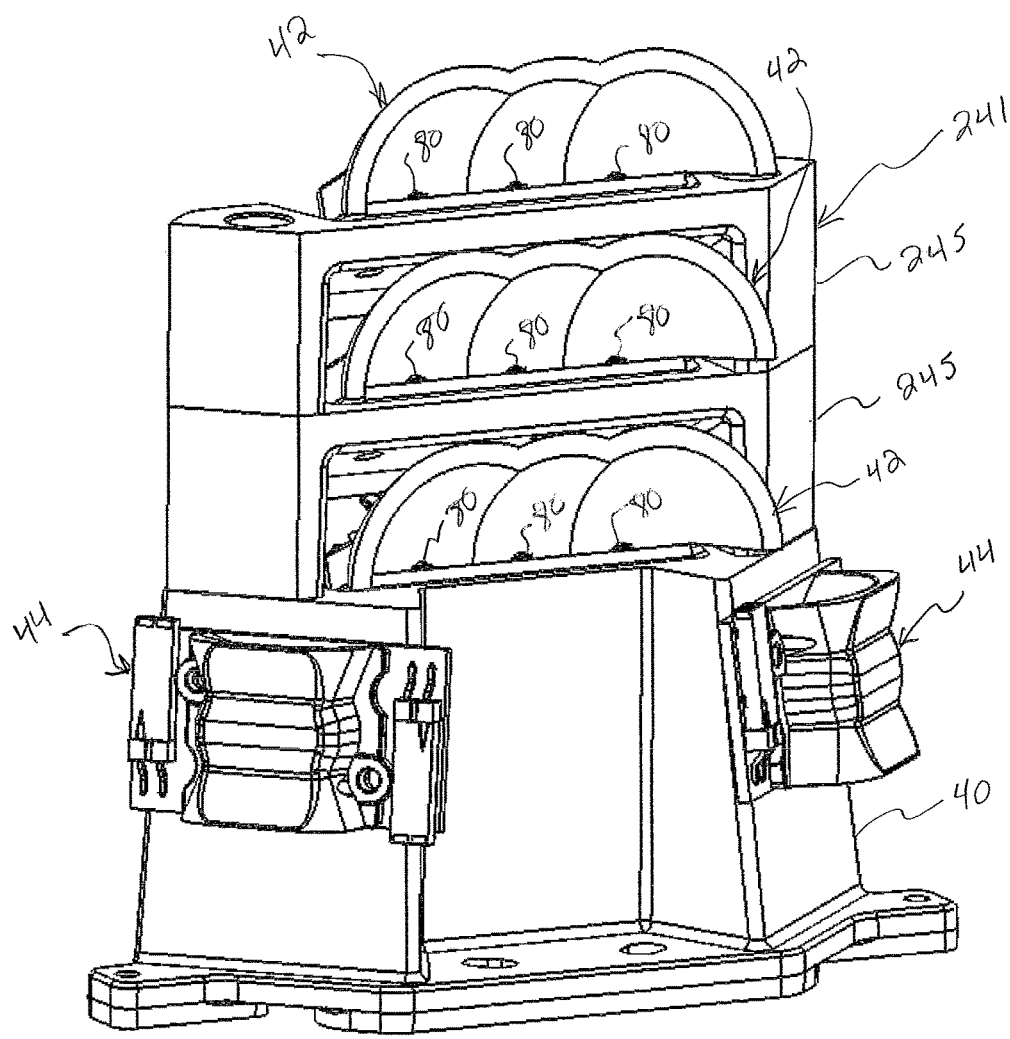
FIG. 11 is a front perspective of the light assembly of FIG. 9 having a baffle removed.

The reflector 78 includes a housing portion 84 and a mounting portion 86. The mounting portion 86 is configured to mount the reflector 78 on the board 76. In the illustrated embodiment, the mounting portion 86 includes two fastener openings 88 sized and shaped for receiving fasteners 90 (e.g., bolts or screws) (FIG. 9). As shown in FIG. 7, the board 76 includes corresponding openings 92 for receiving the fasteners 90. The mounting portion 86 also includes two protrusions 94 (e.g., alignment studs or alignment pins) extending downward for reception in corresponding openings 96 in the board 76. In manufacture, the fasteners 90 and protrusions 94 are further received in the respective openings 70, 71 (FIG. 6) in the LED module mounting surface 50 for mounting the LED module 42 on the heat sink 40. As shown in FIG. 7, the housing portion 84 of the reflector 78 includes three inner reflector surfaces 98 corresponding to respective ones of the LEDs 80. The reflector surfaces 98 bound corresponding LED spaces in which the LEDs 80 are positioned and emit light. The reflector surfaces 98 are generally concave and rounded. In the illustrated embodiment, the three LED spaces are connected to each other such that light can pass from one LED space to another, but the LED spaces can be isolated or spaced from one another. The reflector surfaces 98 are configured for reflecting light emitted from the LEDs 80 generally forward. Referring to FIG. 8, the reflector surfaces 98 have a cross-sectional shape resembling about half of a parabola, but other shapes could be used. Each LED 80 is positioned approximately at the focus of the parabolic shape. As shown in FIG. 8, when the LED module 42 is mounted on the heat sink 40, the board 76 is inclined at an angle A with respect to horizontal. For example, the angle A may be in the inclusive range of about 10 degrees to about 40 degrees, the inclusive range of about 15 degrees to about 35 degrees, or the inclusive range from about 20 degrees to about 30 degrees. For example, the angle A may be about 25 degrees. The arrangement is such that the reflector surfaces 98 are configured to reflect the light generally forward to be viewed from in front of the light assembly 22A. The LED module 42 can have other configurations, such as other numbers of LEDs (e.g., at least one, two, three, four, five, etc.) and other configurations of boards, baffles, and connectors. Light sources other than LEDs, such as other light emitting elements can be used. Moreover, components of the LED module 42 can be omitted.

The halo LED modules 44 include a support or board 102 (e.g., printed circuit board or PCB), a halo lens 104, and an LED (broadly, "light source" or "light emitting element") mounted on the board behind the halo lens. The halo LED modules 44 also include electrical connectors 106 for forming electrical connections with the halo LED modules (e.g., for power supply and/or control signals). The board 102 electrically connects the LED with the electrical connectors 106. The halo lens 104 includes openings 108 for receiving fasteners 52 (FIG. 5) for mounting the lens 104 on the board 102 and for mounting the halo LED module 44 on the heat sink 40 via openings 72 (FIG. 5) in a respective column 54 at the halo LED module mounting surfaces 48.

As shown in FIGS. 3-6, the baffle 46 generally includes a generally opaque baffle body (e.g., shroud 110) and at least one generally opaque removable baffle member 112. In the illustrated embodiment, there are two removable baffle members 112, and they are formed as one piece with the shroud 110 (e.g., injection molded plastic). The baffle members 112 are removable from the shroud 110 by breaking frangible connecting links 114 at perimeters of the removable baffle members. The removable baffle members 112 include main bodies forming generally upright partitions or walls connected to the shroud by the frangible connections and include baffle elements 116 in the form of generally horizontal partitions or walls extending rearward from rear surfaces of the main bodies. The shroud 110 defines a front window having a lower portion, an intermediate portion, and an upper portion. The intermediate and upper portions of the window are covered by the removable baffle members 112, and the lower window portion is open. As will become apparent, one or both of the removable baffle members 112 can be removed if desired to provide another directional LED module 42 for emitting light through the intermediate and/or the upper portions of the window. In the illustrated embodiment, the lower, intermediate, and upper portions of the window are not separated from one another, but separating structure could be provided (e.g., a segmented window). The baffle 46 includes legs 120 extending down from the shroud 110 and arms 122 extending inward laterally from the legs. The arms 122 are configured to extend behind the heat sink 40 and include respective fastener openings 124 for optionally receiving fasteners therein for securing the baffle to the heat sink. The legs 120 include feet 126 having protrusions 128 (e.g., studs or pins) extending downward therefrom for reasons explained later (alignment). The legs 120 include openings 130 through which electrical wires or cables may be run to the LED modules (e.g., to the halo LED modules 44). The baffle 46 can be made of any suitable material, such as plastic. The shroud 110, removable baffle members 112, legs 120, and/or arms 122 desirably have the same color as the LED modules 42, 44 are configured to emit. Thus, during the day, when the LED modules 42, 44 may not be energized, the baffle 46 is visible in daylight and can serve to indicate the selected color.

Figure 4:
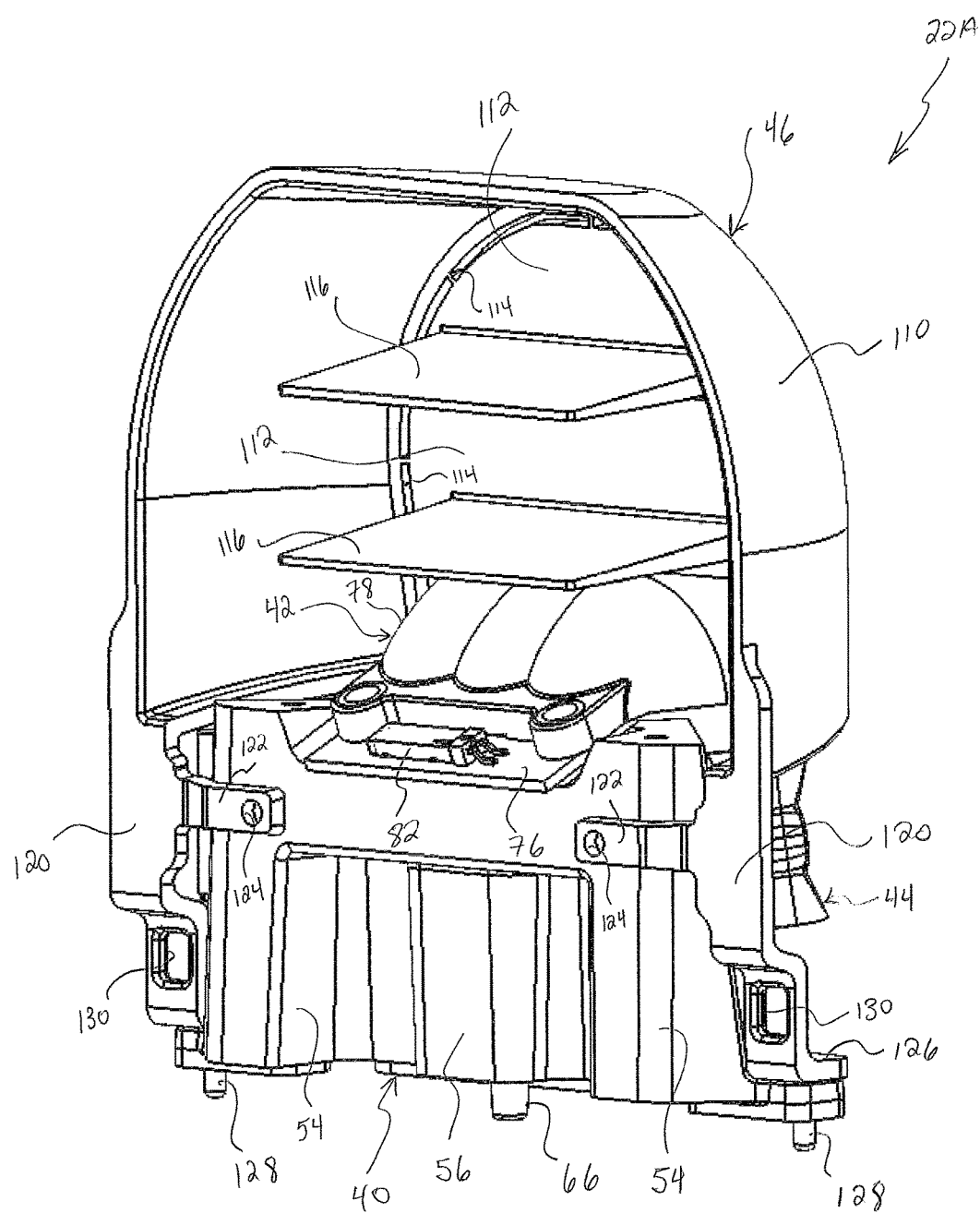
FIG. 4 is a rear perspective of the first light assembly of FIG. 3.

It will be appreciated that the baffle 46 is configured to permit light from the LED modules 42, 44 to emit generally forward from the light assembly 22A but inhibit light from the LED modules from emitting generally rearward, toward the second (rear) light assembly 22B. The baffle 46 is also configured to inhibit light from the second (rear) light assembly 22B from emitting generally forward toward the first (front) light assembly 22A. The arrangement is such that the head 12 is configured for emitting light generally forward from the first light assembly 22A and emitting light generally rearward from the second light assembly 22B. The general shape and size of the shroud 110 is chosen to substantially fill the front half of the cover 30 to create a partition to inhibit forward emission of light from the second (rear) light assembly 22B. Likewise, the shroud 110 generally inhibits light reflecting off the front side of the cover 30 from emitting rearward past the shroud 110. In addition, as shown in FIGS. 4 and 6, the baffle elements 116 of the removable baffle members 112 assist in inhibiting light from passing into or out of the interior of the shroud 110 over the top of the directional LED module 42. The baffle element 116 of the lower removable baffle member 112 forms a hood over the directional LED module 42 to block light transmission over the top of the directional LED module.

In one aspect of the airfield light 10 of the present disclosure, a modular design is used to permit manufacture of lights having different lighting capabilities and characteristics using modular components. As explained above, the baffle 46 includes removable baffle members 112 for uncovering the intermediate and/or upper light portions when additional LED modules are used. Referring to FIGS. 9-15, a second embodiment of a light assembly 222A, including additional LED modules 42, is indicated generally by the reference number 110. Like parts are indicated by the same reference numbers. The light assembly 222A includes a heat sink 241, the baffle 46, and multiple LED light modules 42, 44. In this embodiment the heat sink 241 comprises a heat sink assembly, and the heat sink assembly includes a heat sink base 40 having the same construction as the heat sink 40 of the light assembly 22A described above. The baffle 46 has the same construction as the baffle 46 described above, except the removable baffle members 112 have been removed by breaking the frangible connecting links 114. The directional LED modules 42 have the same construction as the directional LED module 42 described above. Desirably, the LEDs 80 of all of the modules 42 emit light of the same color. The greater number of LEDs 80 provides greater overall light intensity.

Figure 12:
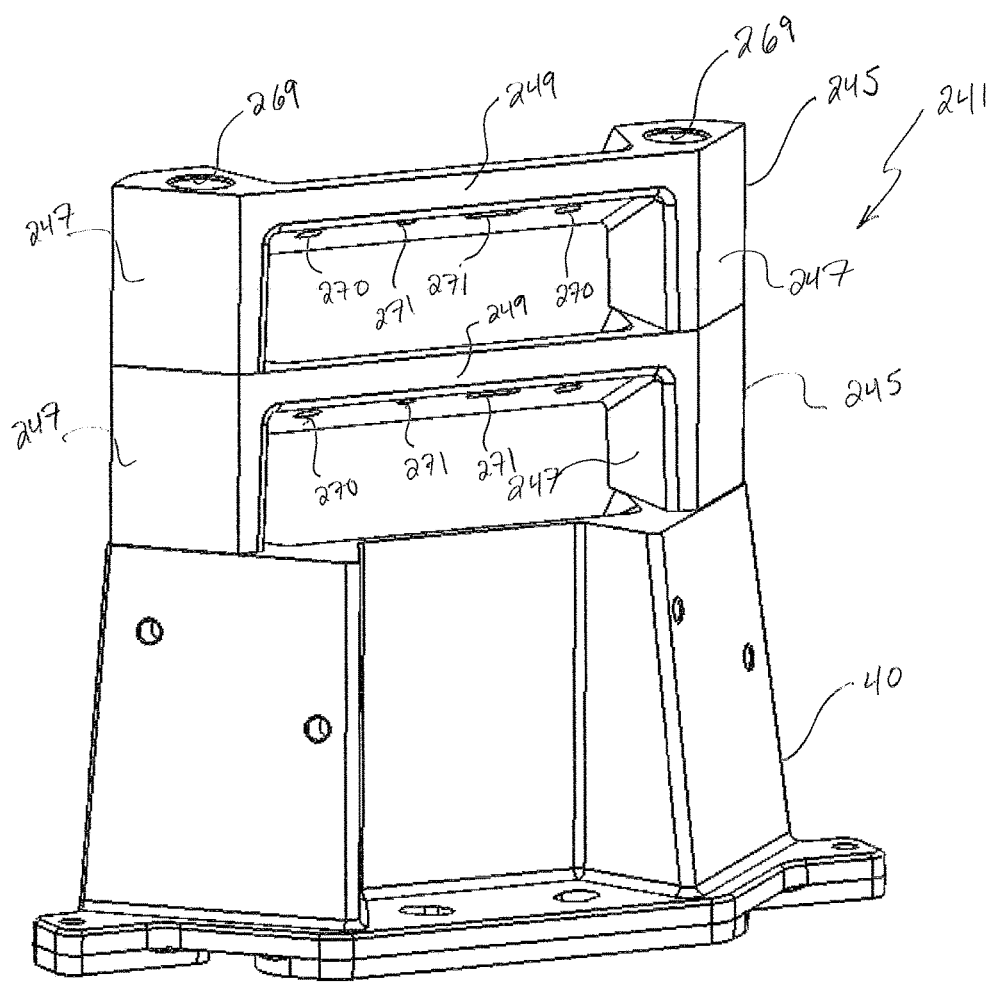
FIG. 12 is a front perspective of a heat sink of the light assembly of FIG. 9.
Figure 13:
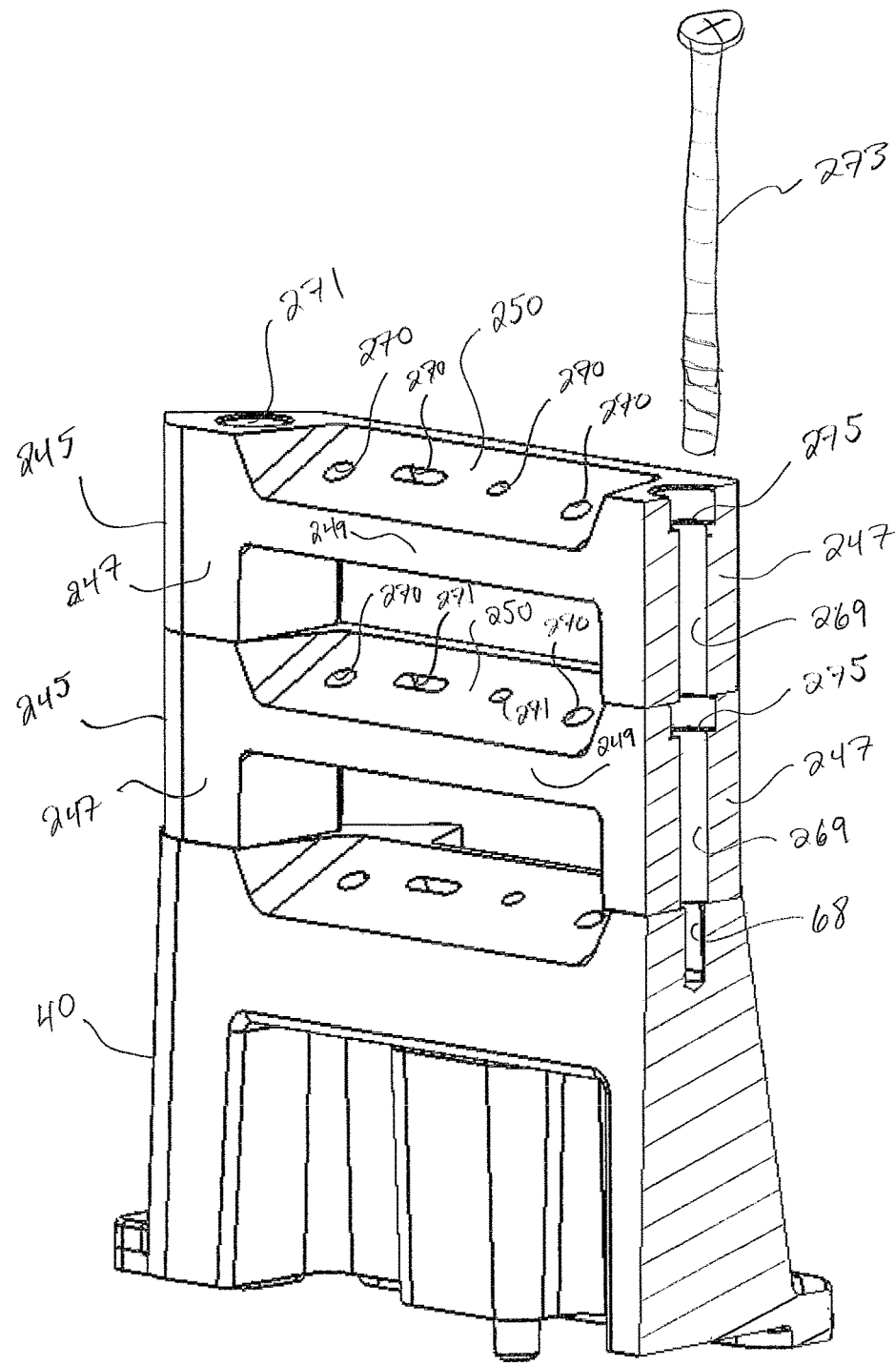
FIG. 13 is a rear perspective of the heat sink having a portion broken away to show fastener passages in the heat sink.

Referring to FIGS. 12 and 13, the heat sink assembly 241 includes the base heat sink 40 and first (lower) and second (upper) heat sink modules 245 stacked on the base heat sink.

The heat sink modules 245 are modular in the sense that they have the same construction. The modules 245 each include first and second columns 247 and a bridge 249 extending between the columns. The columns 247 have feet for supporting the modules. The feet of the first (lower) heat sink module 245 support the module on heads of the columns 247 of the base heat sink 40. The feet of the second (upper) heat sink module 245 support the module on heads of the columns 247 of the first heat sink module 245. LED module mounting surfaces 250 (FIG. 13) are provided on the top of the bridges 249 for mounting the additional LED modules 42. The LED module mounting surfaces 250 of the heat sink modules have the same configuration as the LED module mounting surface 50 of the heat sink described above. For example, the LED module mounting surfaces 250 are inclined and include openings 270, 271 for mounting the LED modules 42 thereon. The heat sink modules 245 are configured to straddle an LED module 42 immediately below the heat sink modules. In other words, the heat sink modules 245 are configured to provide a space under the bridge 249 and between the columns 247 sized to permit an LED module 245 to be mounted on the LED mounting surface 250 below the heat sink module 245. The arrangement is such that any number of heat sink modules 245 could be stacked to permit mounting of a corresponding number of LED modules 42 on the heat sink assembly 241. In the illustrated embodiment, the height of the heat sink 241 and number of LED modules 42 is limited by the height of the baffle 46 and the cover 30. It will be appreciated that the top and intermediate LED modules 42 mounted on the heat sink assembly 241 are positioned for emitting light through the top and intermediate portions of the baffle window opened by removing the removable baffle members 112.

As shown in FIG. 13, the heat sink modules 245 include fastener passages 269 extending generally vertically through the columns 247 from the heads to the feet of the columns to permit a fastener 273 (FIG. 13) to secure the heat sink modules 245 to the base heat sink 40. Although the fastener passages 269 in only one side of the heat sink 241 are shown, it will be understood that similar heat sink passages are provided in the other side along with a corresponding fastener. In the illustrated embodiment, the fastener 273 is provided in the form of a screw or bolt that forms a threaded connection with the fastener openings 68 in the base heat sink 40. The fastener passages 269 in the heat sink modules have shoulders 275 for engagement with a head of the fastener 273. In the illustrated embodiment, the head of the fastener 273 engages the shoulder 275 of the top heat sink module 245 for securing the heat sink modules in stacked relationship against the base heat sink 40. It will be appreciated that, if desired, the top heat sink module 245 and top LED module 42 could be omitted, in which case the top baffle member 112 would not be removed, and a shorter heat sink assembly fastener 273 would be used, such that a head of the fastener would engage the shoulder 275 of the first (lower) heat sink module 245 when a threaded connection is made with the fastener opening 68 in the base heat sink 40.

It will be appreciated that the light assemblies 22A, 222A can be provided as the front and/or rear light assembly of an airfield light. For example, if greater intensity is desired for the forward or rear light assembly, the light assembly 222A shown in FIGS. 9-10 (three directional LED modules 42) could be used, and if less intensity is desired for the forward or rear light assembly, the light assembly 22A shown in FIGS. 3-4 (one directional LED module 42) could be used. If medium intensity is desired, the discussed variation of the light assembly having two directional LED modules 42 could be used. Given the modular nature of the LED modules 42 and heat sink modules 245, and the removable baffle members 112 of the baffle 46, several combinations can be made, to provide the desired light intensity facing in the first and second directions.

Figure 14:
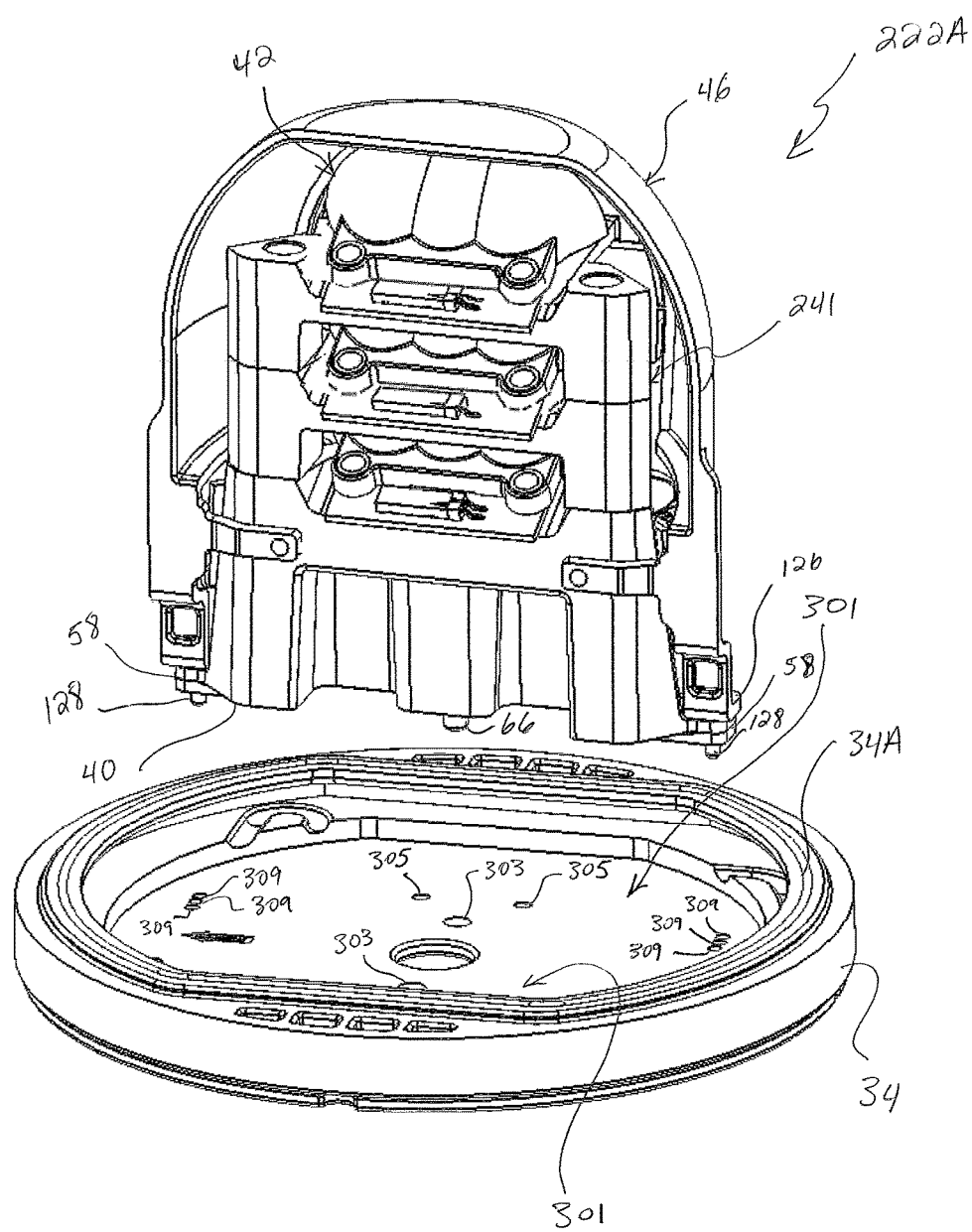
FIG. 14 is a rear perspective of the light assembly of FIG. 9 and a platform for mounting the light assembly.
Figure 15:
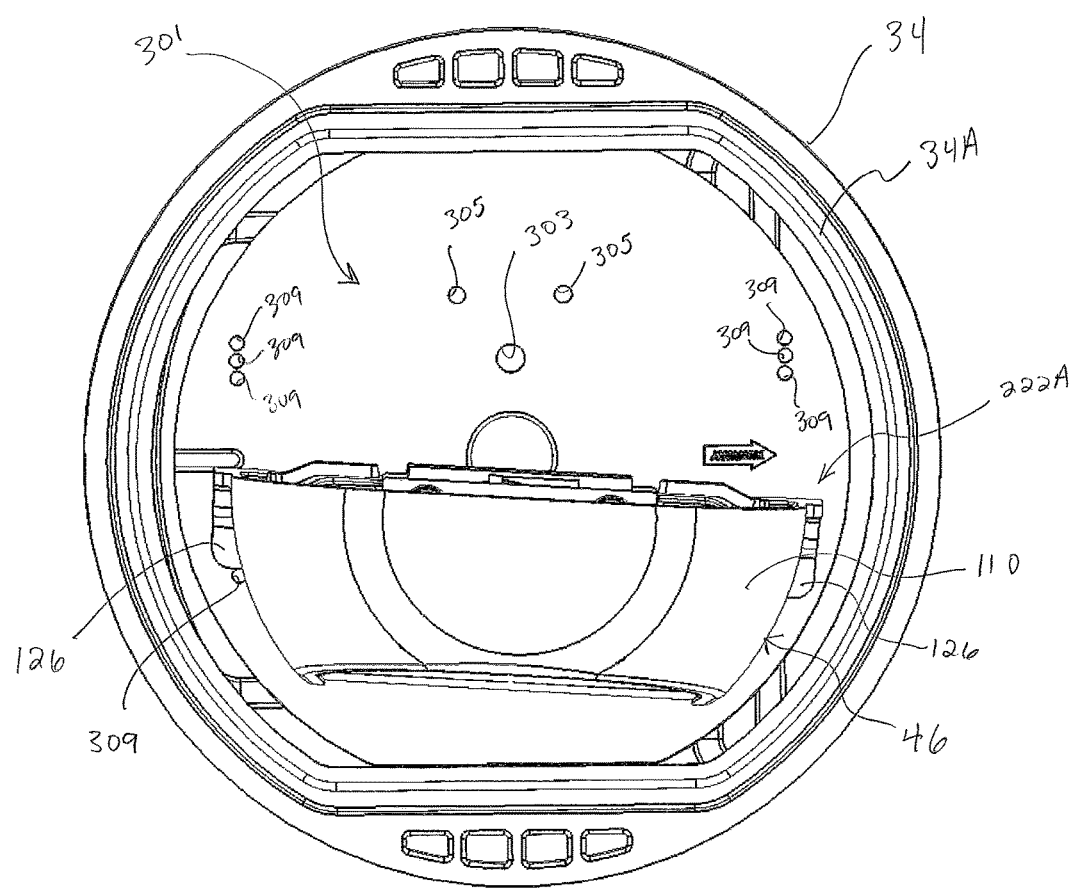
FIG. 15 is a top view of the light assembly mounted on the platform.

Now referring to FIGS. 14 and 15, the light assembly 222A and platform 34 are configured to permit aiming of the light assembly 222A. More specifically, the light assembly 222A can be aimed directly in the first or second direction or to the left or right of the first or second directions. The platform 34 defines two mounts 301 on which the light assemblies 22A, 222A, 22B are mountable. Each mount 301 includes a first central opening 303 for receiving the protrusion 66 on the bottom of the heat sink base 40. The mounts 301 also include second openings 305 for receiving optional fasteners 307 (FIG. 9) received in the openings 64 in the front flange 60 of the heat sink base 40. In the illustrated embodiment, the openings 64 in the front flange 60 are slots (see FIG. 9), such that the heat sink base 40 can be pivoted about an axis defined by the protrusion 66, and the slots 64 align with the openings 305 in the platform within a range of pivoting movement of the heat sink base 40. Finally, the mount includes two sets of three openings 309 for receiving the protrusions 128 extending downward from the feet 126 of the baffle 46. In an alternate design, dowel pins could be used in place of the protrusions 128. When the protrusions 128 are received in the openings 62 of the left and right heat sink flanges 58, the protrusions protrude below the heat sink for reception in a selected one of the openings 309. For example, the openings 309 may be spaced from each other along an arc and be equidistant from the pivot axis defined by the protrusion 66 or equidistant from the central opening 303. When the heat sink base 40 faces directly forward, the intermediate openings 309 of each series are aligned with the openings 62 of the left and right heat sink flanges 58 for reception of the baffle protrusions 128. When the heat sink base 40 is turned slightly to the left (e.g., in the inclusive range from about 1 to 10 degrees, or from about 1 to 5 degrees, such as about 1 degree) the rear opening 309 of the left series is aligned with the opening 62 of the left heat sink flange 58, and the front opening 309 of the right series is aligned with the opening 62 of the right heat sink flange 58, for receiving the baffle protrusions 128. Thus the mounting of the light assembly 222A on the platform 34 permits aiming or orienting of the light assembly in a selected direction. In FIG. 15, the light assembly 222A is shown mounted on the platform 34 such that the light assembly is aimed slightly to the left. The rear light assembly could be aimed similarly slightly to the left, or could be aimed directly rearward or slightly to the right. It will be appreciated that the heat sink 40 and baffle 46 of the first embodiment of the light assembly 22A permits the same aiming capability in mounting the light assembly on the platform 34.

Figure 16:
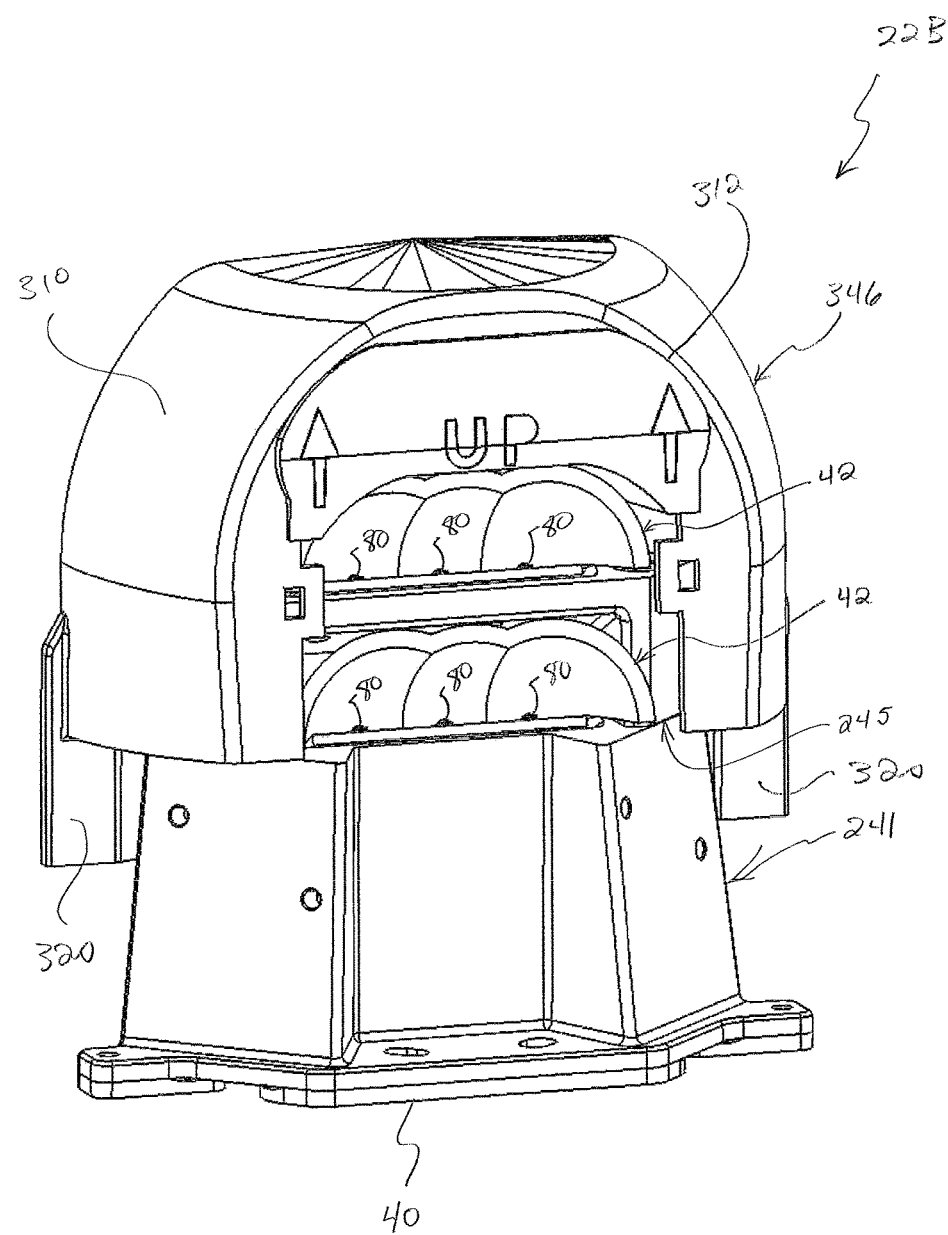
FIG. 16 is a front perspective of a third embodiment of a light assembly of the present disclosure.
Figure 17:
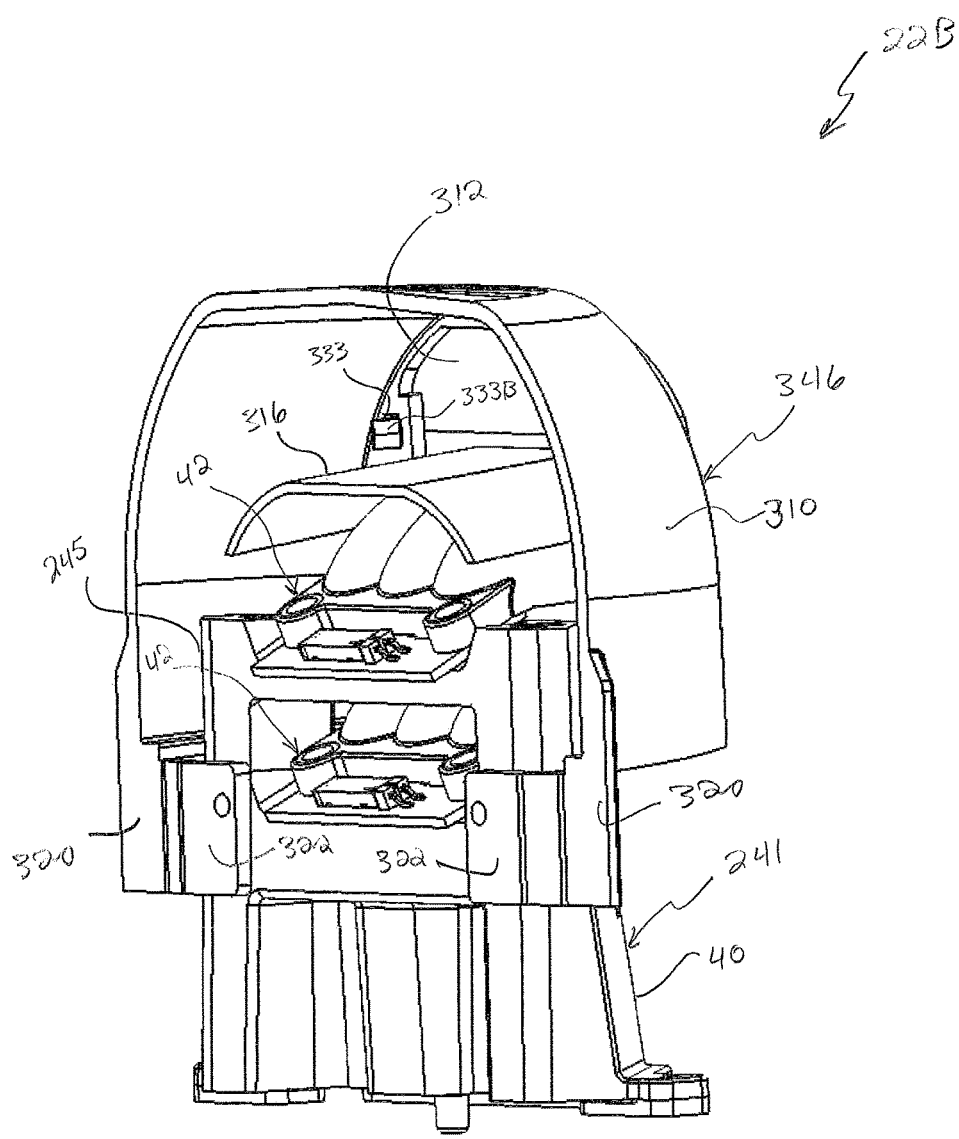
FIG. 17 is a rear perspective of the light assembly of FIG. 16.
Figure 18:
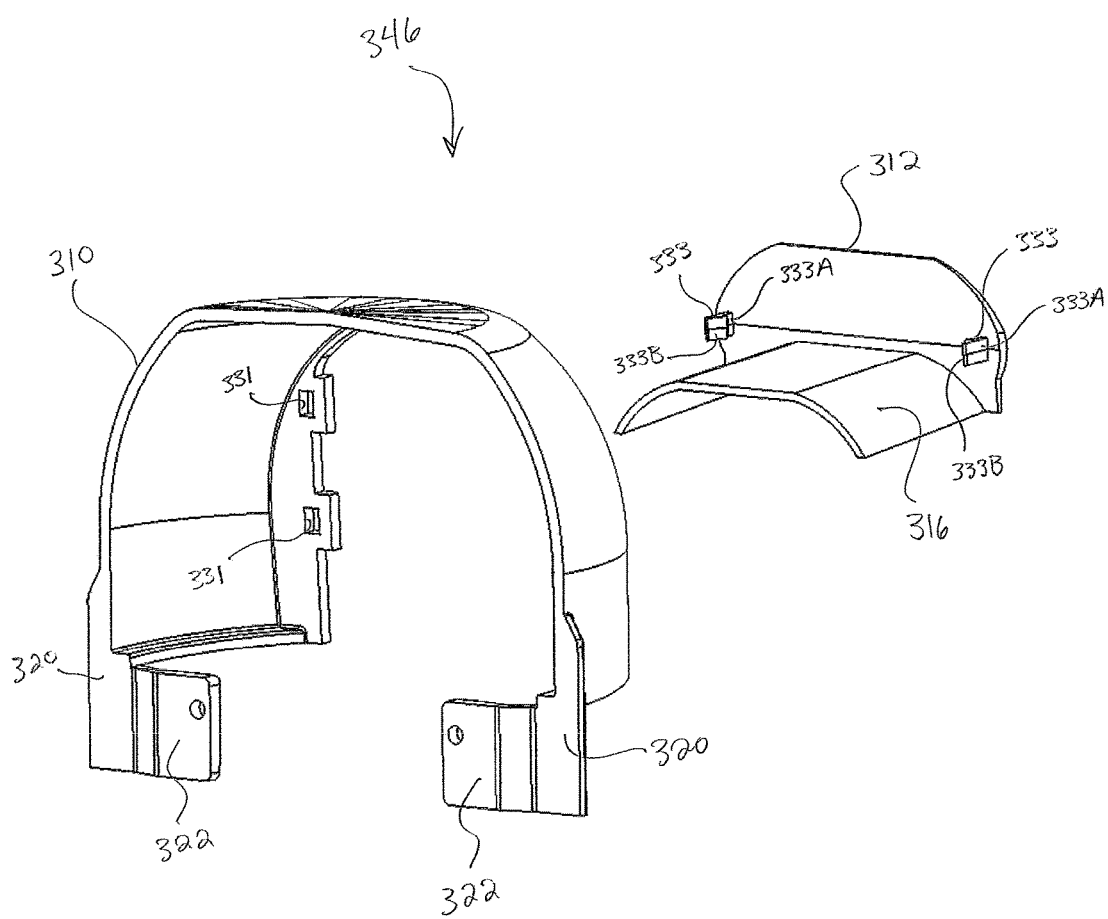
FIG. 18 is an exploded rear perspective of a baffle of the light assembly of FIG. 16.

Referring now to FIGS. 16-18, a light assembly of a third embodiment is indicated generally by the reference number 22B. As explained above, this light assembly 22B is shown as the rear light assembly of the light 10 in FIGS. 1 and 2. This light assembly 22B is similar to the light assemblies 22A, 222A and like parts are indicated by the same reference numbers. For example, the light assembly 22B includes a heat sink 241, a baffle 346, and multiple LED modules 42. In this embodiment, the heat sink assembly 241 includes the heat sink base 40 and only one heat sink module 245. Two directional LED modules 42 are provided and no halo LED modules. The baffle 346 has a similar but different construction than the baffle 46 discussed above. The baffle 346 includes a shroud 310 and a removable baffle member 312. As shown in FIG. 17, the baffle member 312 includes a baffle element 316 forming a curved hood over the top of the upper LED module 42. The baffle 346 includes legs 320 extending downward from the shroud 310 and arms 322 extending laterally inward from the legs having fastener openings 324 for optionally receiving fasteners for securing the baffle to the heat sink assembly 241. In this embodiment, the removable baffle member 312 is not connected to the shroud 310 by a frangible connection. Instead, the removable baffle member 312 is mounted on the shroud 310 by a releasable snap connection and can be mounted on the shroud at predetermined elevations. The shroud 310 includes mounting structure in the form of rectangular openings 331 at left and right sides of the top and intermediate portions of the shroud window. The removable baffle member 312 includes mounting structure in the form of releasable catches 333 extending rearward from left and right sides of the rear surface of the main body of the baffle member. Each catch 333 includes an arm 333A and a retainer 333B extending laterally inward from the arm. The retainer has a ramped surface facing inward such that as the catches 333 are pushed into the openings 331 in the shroud 310, the arms 333A temporarily deflect outwardly until the retainers 333B pass through the shroud openings, at which point the arms resiliently snap back and the retainers maintain the removable baffle member 312 on the shroud 310 by engagement of the retainers with a rear surface of the shroud adjacent the openings 331. Thus, the removable retainer 312 forms a snap connection with the shroud 310 for mounting the removable retainer on the shroud. The snap connection can be releasable (e.g., by deflecting the arms 333A to disengage the retainers 333B) such as by deflecting the arms to disengage the retainers to permit removal of the catches from the shroud. The snap connection can be referred to as a fastening of the baffle member 312 to the shroud 310 or a mating connection of the baffle member with the shroud. The baffle member 312 can be formed of the same color plastic as the shroud 310 (e.g., the same color as the LEDs 80 are configured to emit). It will be appreciated that two baffle members 312 can be provided for closing the upper and intermediate portions of the baffle window if it is desired to provide only the lower directional LED module 42. On the other hand, no baffle members 312 may be used if it is desired to use three directional LED modules 42 with the upper, intermediate, and lower portions of the baffle window open.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:
1. An airfield light comprising:
a support;
a first light source connected to the support;
a baffle proximate the first light source, the baffle including
a generally opaque baffle body defining a window having a first open portion through which light emitted from the first light source may pass, and
a generally opaque baffle member secured to the baffle body and blocking a closed portion of window to inhibit light emitted from the first light source from passing therethrough, wherein the generally opaque baffle member is removable from the baffle body to create a second open portion of the window; and
a generally light-transmissible cover surrounding the first light source and the baffle such that the light emitted by the first light source through the first open portion of the window passes through the cover,
wherein the baffle is sized and shaped to be in a close fitting relationship with a portion of the cover,
wherein the baffle is sized and shaped to fill a front portion of the cover to inhibit light emitted by the first light source from entering a back portion of the cover.
2. An airfield light as set forth in claim 1, wherein the baffle further includes a second generally opaque baffle member secured to the baffle body and blocking a second closed portion of window to inhibit light emitted from the first light source from passing therethrough, wherein the second generally opaque baffle member is removable from the baffle body to create a third open portion of the window.
3. An airfield light as set forth in claim 1, wherein the baffle further includes a generally opaque partition positioned above the first light source to block light emitted from the first light source.
4. An airfield light as set forth in claim 3, wherein the partition is secured to the baffle member adjacent the first open portion of the window and is removable from the baffle member.
5. An airfield light as set forth in claim 1, wherein the support is a first support and the baffle is a first baffle, the airfield light further comprising:
a second support;
a second light source connected to the second support; and
a second baffle proximate the second light source, the second baffle including
a generally opaque baffle body defining a window having a first open portion through which light emitted from the second light source may pass, and
a generally opaque baffle member secured to the baffle body and blocking a closed portion of window to inhibit light emitted from the second light source from passing therethrough, wherein the generally opaque baffle member is removable from the baffle body to create a second open portion of the window.
6. An airfield light as set forth in claim 5, wherein the light emitted from the first light source is directed in a first direction, the light emitted from the second light source is directed in a second direction, the first and second directions being generally opposite of one another.
7. An airfield light as set forth in claim 6, wherein the first baffle inhibits light emitted by the first light source from traveling in the second direction, wherein the second baffle inhibits light emitted by the second light source from traveling in the first direction.
8. An airfield light as set forth in claim 5, wherein a first baffle color of the first baffle and a first light color of the light emitted by the first light source are generally the same, wherein a second baffle color of the second baffle and a second light color of the light emitted by the second light source are generally the same, wherein the first baffle color and first light color are different than the second baffle color and second light color.

9. A method of assembling an airfield light, the method comprising:
mounting first and second light assemblies on a support;
removing at least a first generally opaque baffle member from a baffle body of a baffle;
arranging the baffle to shroud the first and second light assemblies, the first and second light assemblies configured to emit light through a window defined by the baffle, the second light assembly configured to emit light through a portion of the window opened by removing the first generally opaque baffle member from the baffle body; and
mounting a third light assembly on the support and removing a second generally opaque baffle member from the baffle body, the third light assembly being configured to emit light through a portion of the window opened by removing the second generally opaque baffle member.

10. A method as set forth in claim 9, further comprising:
mounting third and fourth light assemblies on a second support;
removing at least a first generally opaque baffle member from a baffle body of a second baffle;
arranging the second baffle to shroud the third and fourth light assemblies, the third and fourth light assemblies configured to emit light through a window defined by the second baffle, the fourth light assembly configured to emit light through a portion of the window opened by removing the first generally opaque baffle member from the baffle body of the second baffle;
arranging the second support and second baffle with respect to the support and the baffle such that the light emitted from the first light source is emitted in a first direction, the light emitted from the second light source is emitted in a second direction, the first and second directions being generally opposite of one another.

11. An airfield light comprising:
a first support;
a first light source connected to the support; and
a first baffle proximate the first light source, the first baffle including
a generally opaque baffle body defining a window having a first open portion through which light emitted from the first light source may pass, and
a generally opaque baffle member secured to the baffle body and blocking a closed portion of window to inhibit light emitted from the first light source from passing therethrough, wherein the generally opaque baffle member is removable from the baffle body to create a second open portion of the window;
a second support;
a second light source connected to the second support; and
a second baffle proximate the second light source, the second baffle including
a generally opaque baffle body defining a window having a first open portion through which light emitted from the second light source may pass, and
a generally opaque baffle member secured to the baffle body and blocking a closed portion of window to inhibit light emitted from the second light source from passing therethrough, wherein the generally opaque baffle member is removable from the baffle body to create a second open portion of the window,
wherein the light emitted from the first light source is directed in a first direction, the light emitted from the second light source is directed in a second direction, the first and second directions being generally opposite of one another.

12. An airfield light as set forth in claim 11, wherein the baffle further includes a second generally opaque baffle member secured to the baffle body and blocking a second closed portion of window to inhibit light emitted from the first light source from passing therethrough, wherein the second generally opaque baffle member is removable from the baffle body to create a third open portion of the window.

13. An airfield light as set forth in claim 11, wherein the baffle further includes a generally opaque partition positioned above the first light source to block light emitted from the first light source.

14. An airfield light as set forth in claim 13, wherein the partition is secured to the baffle member adjacent the first open portion of the window and is removable from the baffle member.

15. An airfield light as set forth in claim 11, further comprising a generally light-transmissible cover surrounding the first light source and the baffle such that the light emitted by the first light source through the first open portion of the window passes through the cover.

16. An airfield light as set forth in claim 15, wherein the baffle is sized and shaped to be in a close fitting relationship with a portion of the cover.

17. An airfield light as set forth in claim 16, wherein the baffle is sized and shaped to fill a front portion of the cover to inhibit light emitted by the first light source from entering a back portion of the cover.

18. An airfield light as set forth in claim 11, wherein a first baffle color of the first baffle and a first light color of the light emitted by the first light source are generally the same, wherein a second baffle color of the second baffle and a second light color of the light emitted by the second light source are generally the same, wherein the first baffle color and first light color are different than the second baffle color and second light color.

* * * * *